(12) United States Patent
Abbas et al.

(10) Patent No.: US 7,854,955 B2
(45) Date of Patent: *Dec. 21, 2010

(54) CORN FIBER HULLS AS A FOOD ADDITIVE OR ANIMAL FEED

(75) Inventors: Charles Abbas, Champaign, IL (US); Kyle E. Beery, Decatur, IN (US); Michael J. Cecava, Decatur, IN (US); Perry H. Doane, Decatur, IN (US)

(73) Assignee: Archer-Daniels-Midland Company, Decatur, IL (US)

( * ) Notice: Subject to any disclaimer, the term of this patent is extended or adjusted under 35 U.S.C. 154(b) by 923 days.

This patent is subject to a terminal disclaimer.

(21) Appl. No.: 11/384,762

(22) Filed: Mar. 20, 2006

(65) Prior Publication Data

US 2006/0216396 A1 Sep. 28, 2006

Related U.S. Application Data

(60) Provisional application No. 60/663,825, filed on Mar. 21, 2005.

(51) Int. Cl.
*A23K 1/00* (2006.01)
*A23L 1/20* (2006.01)
*A23L 1/10* (2006.01)

(52) U.S. Cl. .................. 426/635; 426/630; 426/482

(58) Field of Classification Search ................. None
See application file for complete search history.

(56) References Cited

U.S. PATENT DOCUMENTS

| | | | |
|---|---|---|---|
| 4,181,747 A | 1/1980 | Kickle et al. | |
| 4,181,748 A | 1/1980 | Chwalek et al. | |
| 4,287,220 A * | 9/1981 | Pappas et al. | 426/623 |
| 4,552,775 A * | 11/1985 | Baeling et al. | 426/624 |
| 4,859,485 A * | 8/1989 | Linton et al. | 426/623 |
| 4,997,665 A | 3/1991 | Grethlein | |
| 5,061,497 A * | 10/1991 | Thacker et al. | 426/31 |
| 5,254,673 A * | 10/1993 | Cook et al. | 530/373 |
| 5,843,499 A | 12/1998 | Moreau et al. | |
| 6,352,845 B1 | 3/2002 | Buchanan et al. | |
| 6,589,760 B1 | 7/2003 | Buchanan et al. | |
| 6,692,578 B2 * | 2/2004 | Schmidt et al. | 127/37 |
| 6,830,771 B2 * | 12/2004 | Lanter et al. | 426/573 |
| 2003/0235633 A1 | 12/2003 | Abbas et al. | |
| 2005/0220951 A1 | 10/2005 | Abbas et al. | |

OTHER PUBLICATIONS

Notice of Allowance and Fee(s) Due for U.S. Appl. No. 11/084,933 of Abbas et al. for "Ethanol Extraction of Phytosterols from Corn Fiber".

* cited by examiner

*Primary Examiner*—Timothy M Speer
*Assistant Examiner*—Felicia C King

(57) ABSTRACT

The present invention provides a novel animal feed or food additive that may be made from thermochemically hydrolyzed, solvent-extracted corn fiber hulls. The animal feed or food additive may be made, for instance, by thermochemically treating corn fiber hulls to hydrolyze and solubilize the hemicellulose and starch present in the corn fiber hulls to oligosaccharides. The residue may be extracted with a solvent to separate the oil from the corn fiber, leaving a solid residue that may be prepared, for instance by aggolmerating, and sold as a food additive or an animal feed.

17 Claims, No Drawings

CORN FIBER HULLS AS A FOOD ADDITIVE OR ANIMAL FEED

CROSS-REFERENCE TO RELATED APPLICATION

This application is a nonprovisional of and claims the benefit of priority to U.S. Provisional Patent Application Ser. No. 60/663,825, filed on Mar. 21, 2005, entitled "Corn Fiber Hulls As A Food Additive Or Animal Feed", having the same named applicants as inventors, namely, Charles Abbas, Kyle E. Beery, Michael J. Cecava, and Perry H. Doane. The entire contents of U.S. Provisional Patent Application Ser. No. 60/663,825 is incorporated by reference into this nonprovisional utility patent application.

STATEMENT OF FEDERALLY SPONSORED RESEARCH

The U.S. Government has a paid-up license in this invention and the right in limited circumstances to require the patent owner to license others on reasonable terms as provided for by the terms of Award Number 04-03-CA-7060 awarded by U.S. DOE (Department of Energy).

BACKGROUND OF THE INVENTION

1. Field of the Invention

This invention relates to a new food additive or animal feed that may be made from thermochemically hydrolyzed, solvent-extracted corn fiber hulls.

2. Description of the Background Art

Corn fiber is produced by corn wet-milling at the rate of about 13% per bushel of corn processed. More than approximately 15,000 tons of corn fiber are produced per day at wet-mills according to the Corn Refiners Association. Along with the corn fiber, portions of the protein, oil, and starch from corn are separated with the fiber stream, and when combined with corn steep liquor and stillage that are sprayed on the fiber along with corn germ meal, which is mixed into the stream, a total of about 25% of the corn processed becomes part of the corn gluten feed stream. Corn steep liquor is the liquid that is derived from the initial steeping of the corn kernels, and stillage is the bottoms from the distillation of the ethanol fermentation broth.

The corn steep liquor and stillage provide nutrients and protein to the corn gluten feed, which is a low value by-product stream that is sold as animal feed. It is desirable to obtain higher value streams from this relatively low value stream. In the present invention, the corn fiber stream, which has been processed to separate higher-value products, such as phytosterol-containing corn fiber oil, can be utilized as a food additive or a digestible animal feed. The invention also covers the fiber produced by the process and uses of this fiber as a food additive. The invention also includes the animal feed produced by the process, and any animal feed with similar properties.

Corn fiber is composed of approximately 15-25% starch, 10-13% protein, 33-42% hemicellulose, 15-18% cellulose, 3-6% ash, 3-6% oil, and 1-2% other components. The hemicellulose is composed of about 50-55% xylose, 30-35% arabinose, 4-6% galactose, 3-5% D-glucuronic acid and 2-5% other components including mannose, coumaric acid, and ferulic acid. In an exemplary hydrolysis process, a corn fiber stream coming from dewatering presses contains about 30 to about 50% solids. During thermochemical treatment of the corn fiber, the fiber is heated to about 138 to about 190° Centigrade (C), which solubilizes the starch and hemicellulose fractions, while leaving the cellulose intact. Starch is composed of two types of glucose polymers, amylose and amylopectin. Amylose is a linear polymer with the glucose molecules linked by α-1,4-glycosidic bonds, and amylopectin is a highly branched polymer with the glucose molecules linked by α-1,4-glycosidic bonds with α-1,6 linked branches. Hemicellulose in corn fiber is composed of a β-1,4 linked xylose backbone with side-chains composed of arabinose, xylose, glucose, galactose, mannose, glucuronic acid, ferulic acid, and coumaric acid.

The starch can be removed from the fiber by hydrolysis with a combination of heat and either starch-degrading enzymes or sulfuric acid. Under these conditions, the starch polymer is hydrolyzed first to soluble oligosaccharides, which can be further hydrolyzed to glucose by a secondary acid or enzyme hydrolysis step. The hemicellulose can be partially hydrolyzed by treating the corn fiber at temperatures above 121° C., but the complete hydrolysis of the xylan backbone to monomers requires the presence of acid or enzymes.

The hydrolysis of the starch and the hemicellulose can also be combined into a single step. The native corn fiber, containing residual sulfur dioxide from the steeping process, can be treated at high temperatures with the optional addition of acid. This treatment will cause simultaneous hydrolysis of the starch and the hemicellulose.

The monosaccharides from the hydrolyzed starch and hemicellulose can be used in many different industrial applications, including fermentations and catalytic conversion to sugar alcohols and subsequently polyols. The glucose from the starch can be used in a yeast fermentation to produce ethanol, or can be fermented to other products. The xylose can also be similarly fermented to a number of fermentation-derived products known by those persons skilled in the art. The ferulic acid can be used as a feedstock for the production of vanillin.

3. Definitions

As used herein, "wet-milling" is a process by which corn can be converted into ethanol, corn sweeteners, and starches.

As used herein, "corn fiber" is the product obtained from the wet-milling process, which involves an initial steeping of corn kernels in aqueous sulfur dioxide at an elevated temperature followed by gentle grinding and physical separation of the outer fiber layers from starch, protein and other components.

As used herein, "corn steep liquor" is a liquid that is derived from the initial steeping of the corn kernels in wet-milling.

As used herein, "stillage" is the bottoms from the distillation of an ethanol fermentation broth in a wet-milling process.

As used herein, "corn gluten feed" is a relatively low value by-product stream of the wet-milling process that is sold as animal feed As used herein, "phytosterols" include, for example but are not limited to, beta-sitosterol, sitostanol, campesterol, campestanol, stigmasterol, stigmastanol, brassicasterol, and other compounds containing the sterol ring system.

As used herein, "total sterols" include, for example but not limited to, all of the phytosterols described herein. As used herein, phytosterols also include sterol glucosides, sterol fatty acid esters, and sterol ferulate esters.

As used herein, "high solids content" means a corn fiber slurry having a moisture content from about 20 weight percent to about 50 weight percent solids.

As used herein, "acid detergent fiber" (ADF) is the percentage of plant material in a feed or forage insoluble in an acid detergent solution, (equivalent to AOAC method 973.18). Generally, the lower the ADF the more digestible a feed is to an animal.

As used herein, "acid detergent insoluble crude protein" (ADI-CP) is nitrogen remaining in acid detergent fiber residue. ADI-CP is generally considered to be an estimate of heat damage occurring during storage and processing.

As used herein, "neutral detergent fiber" (NDF) is the percentage of cell wall material or plant structure in a feed. The lower the NDF percentage, the more an animal will eat. NDF includes acid detergent fiber and is inversely related to intake, therefore, a low percentage of NDF is desirable.

As used herein, "neutral detergent insoluble crude protein" (NDI-CP) is nitrogen remaining in neutral detergent fiber residue.

As used herein, "lignin" is a biologically unavailable mixture of polymers of phenolic acid. Lignin is generally recognized as a major structural component of mature plants and trees.

As used herein, "relative feed value" (RFV) is a measure of feed value compared to full bloom pure alfalfa, where 100 is equal to full bloom alfalfa, and an RFV above 100 indicates a feed value greater than that of full bloom alfalfa.

As used herein, "net energy for gain" (NEG) is an estimate of the energy of feed available for the deposition of body tissue in non-lactating animals.

As used herein, "net energy for maintenance" (NEM) is an estimate of the energy of feed available for the maintenance of non-lactating animals.

As used herein, "net energy of lactation" (NEL) is an estimate of energy in feed available for body maintenance and milk secretion.

As used herein, "total digestible nutrients" (TDN) is the sum of the digestible protein, digestible nitrogen free extract, digestible crude fiber, and the digestible fat. TDN accounts for fecal loss of digestion and to some extent the urinary energy loss.

As used herein, "nitrogen free extract" (NFE) is the highly digestible portion of a plant, comprised mostly of carbohydrates. NFE is often viewed as what remains after the protein, ash, crude fiber, ether extracts, and moisture content have been obtained.

As used herein, "nonstructural carbohydrates" (NSC) are starches and sugars that serve as energy sources for the feed recipient.

As used herein, "adjusted crude protein" (adj. c. protein) is crude protein corrected for insoluble crude protein.

SUMMARY OF THE INVENTION

The present invention provides a novel animal feed made from thermochemically hydrolyzed, solvent-extracted corn fiber hulls. One corn fiber hull treatment method that may be used is to thermochemically hydrolyze corn fiber, then extract the hydrolyzed corn fiber with a solvent to separate valuable phytosterols. The remaining portion of the extracted corn fiber hulls may be used as animal feed, or it may be further processed and used as animal feed.

Hydrolyzed, extracted corn fiber may be produced, for instance, by obtaining corn fiber at a moisture level of between about 50% to about 70%, then adding water if needed until the moisture level is about 70%. The 70% moisture corn fiber is placed in a sealed, rotating reactor. The reactor is then heated, for instance by using steam, to a temperature of between about 138° C. to about 190° C. That temperature is maintained for about 30 minutes to about one hour. The reactor is then depressurized (if steam is used), and the corn fiber is dewatered. This dewatering removes an oligosaccharide-containing aqueous liquid from the mixture. Optionally, the fiber may be rinsed with a liquid to further remove free sugars from the fiber. In a further optional step, the fiber may be dried to reduce moisture content. The fiber is then extracted with at least about three volumes of 80% to 100% ethanol at about 25° C. to about 75° C. for a time period of about ten minutes to about two hours. Extraction may proceed, for instance, with accompanying agitation and/or stirring of the fiber, or extraction may be performed with a counter current extractor.

The ethanol from the mixture, which contains oil, is further processed to separate that oil. Following extraction, the residual ethanol is removed from the corn fiber by heating the fiber under reduced pressure. The resulting thermochemically hydrolyzed, solvent-extracted corn fiber hull residue can be used as a food additive or as an animal feed, which is an aspect of the present invention. The residue may be further processed to make a food additive or an animal feed as well. For example the residue can be mixed with a liquid, including for example steep liquor or stillage, and optionally pelletized, then used as animal feed.

In one aspect, the invention includes a method for making a food additive or an animal feed, comprising the steps of obtaining a corn fiber slurry having a moisture content from about 30 weight percent to about 50 weight percent solids, thermochemically processing the corn fiber slurry to produce a hydrolyzed corn fiber slurry, dewatering the hydrolyzed corn fiber slurry to create a first residual corn fiber, where the first residual corn fiber having a moisture content from about 30 to about 80 weight percent solids, washing the first residual corn fiber, dewatering the washed, hydrolyzed corn fiber slurry to create a second residual corn fiber, where the second residual corn fiber has a moisture content from about 30 to about 80 weight percent solids, extracting the second residual corn fiber with an extractant and separating at least one phytosterol from the second residual corn fiber to achieve an extracted corn fiber, collecting the extracted corn fiber, and using the extracted corn fiber as a food additive or as an animal feed.

In a further aspect of the invention, the extractant is ethanol. The residual extractant may be removed under reduced pressure. In a still further aspect of the invention, an additional step includes pelletizing the extracted corn fiber, an alternative additional step includes grinding the extracted corn fiber into a powder. In a yet still further aspect of the invention, an additional step includes adding corn steep liquor to said extracted corn fiber. Another aspect of the invention includes the step of adding stillage to said extracted corn fiber.

In a still further aspect, the thermochemically hydrolyzed, solvent-extracted corn fiber is a food additive. In another aspect, the animal feed of the invention is fed to a ruminant. In another aspect, the animal feed is fed to a monogastric. In another aspect, the feed is fed to poultry. Another aspect of the invention includes the step of adding water to the corn fiber slurry to reach a moisture content of about 30 weight percent solids.

In a yet still further aspect of the invention, the thermochemical processing step includes the steps of placing the corn fiber slurry in a sealed reactor, rotating the sealed reactor, heating the sealed reactor to a temperature between about 138 to about 150° C. Another aspect includes maintaining the rotating and the heating for between about 30 minutes to about 60 minutes, then depressurizing the sealed reactor.

In a further aspect of the invention, the extracting step is performed using at least about 3 volumes of ethanol, wherein said ethanol is included in an ethanol/water mixture with a ratio of ethanol to water of between about 70:30 to about 100:0. The extracting step may be performed at a temperature between about 25 to about 75° C. The extracting step may be performed for between about 2 minutes to about 120 minutes.

A further aspect of the invention includes a food additive or an animal feed that may be produced by any method disclosed herein.

DETAILED DESCRIPTION OF THE INVENTION

Given the large amount of corn fiber hulls produced each year, it was desirable to obtain higher value streams from the corn fiber hulls. It was further desired to create a method to obtain these higher value streams while generating a corn fiber byproduct that was still suitable for use as a food additive or as an animal feed.

Three higher value products that may be obtained are ethanol, polyols, and phytosterols. Ethanol may be produced by liberating and fermenting monosaccharides or disaccharides contained in the corn fiber biopolymers starch and hemicellulose. Corn fiber also contains cellulose, but the treatment conditions under which ethanol is produced are generally not extreme enough to hydrolyze cellulose. The liberation of monosaccharides from corn fiber may be accomplished, for example, by hydrolyzing starch and hemicellulose contained in corn fiber to soluble oligosaccharides, then further hydrolyzing the oligosaccharides to monosaccharides or disaccharides. Monosaccharides or disaccharides may be fermented to ethanol.

Starch may be removed from corn fiber by hydrolysis with a combination of heat and either starch-degrading enzymes or sulfuric acid. Other methods may also be employed to remove the starch, including excess water washing, enzyme hydrolysis utilizing starch-degrading enzymes, or other chemical treatment. Hemicellulose can be partially hydrolyzed by treating corn fiber at high temperatures, for example, at temperatures above about 121° C.; however, hydrolysis of the hemicellulose xylan backbone generally requires the presence of acid, enzymes, or a combination of the two.

Hydrolysis of starch and hemicellulose may be combined into a single step. Native corn fiber, which contains residual sulfur dioxide from the steeping process, can be treated at high temperatures, for instance at temperatures above about 121° C., with the optional addition of acid. Such a treatment may cause simultaneous hydrolysis of starch and hemicellulose. As hydrolysis temperature increases about 121° C., the percentage of the hemicellulose hydrolyzed will also increase.

It has been reported that corn fiber remaining after the hydrolysis step can be contacted with a solvent to extract the oil present. For example, U.S. Pat. No. 5,843,499, to Moreau at al. reports that the oil fraction, which contains phytosterols, can be extracted from corn fiber using hexane in the presence of the antioxidant, BHT. The process reported in Moreau et al. was completed on dried, ground corn fiber at room temperature with agitation. The extraction set forth in Moreau et al. purportedly resulted in mixed oils containing triglycerides (TAG), fatty acid esters of phytosterols (St-FA), free fatty acids (FFA), tocopherols, free phytosterols (St), and ferulic acid esters of phytosterols (St-F). Moreau et al. reported that the total percentage of oil in normal corn fiber to be as high as 3.33 wt %. Further, Moreau et al. reported approximately 18% (wt/wt) total sterol content (St-FA, St, and St-F) in the extracted oil with 8% as St-FA.

Phytosterols, including beta-sitosterol and its glucoside beta-sitosterolin, closely resemble the molecule cholesterol. These molecules interfere with cholesterol absorption in humans. The lowered absorption of cholesterol from the intestines decreases low density lipoprotein (LDL), which lowers plasma cholesterol levels.

The method disclosed in Moreau et al. differs significantly from the process used to produce the fiber of the present invention, because the extractions described in the present invention are completed on high-solids, thermochemically treated corn fiber. Other differences may exist that are not set forth herein. Also, the extractions that may be used to produce the novel food additive or novel animal feed of the present invention may be carried out on either dry corn fiber or wet, unground corn fiber.

The lack of need for completely dry corn fiber is an advantage of a process that may be used to produce the fiber of the present invention because the energy needed to reduce the fiber from about 65% water (typical for mechanically dewatered corn fiber) to about 0% water is high. Additionally, grain dust explosions are a potential hazard for grain storage and milling operations. By processing wet, unground corn fiber, the chance of a grain dust explosion is minimized. Concentrations from about 0%/100% water/ethanol to about 30%/70% water/ethanol of the extractant may be used in the process of the present invention to extract the phytosterols. If the water content of the corn fiber after thermochemical treatment is about 65%, then about 325% of the weight of the total corn fiber stream will need to be added in anhydrous ethanol to achieve an 20%/80% solvent. Therefore, if the amount of water present in the corn fiber can be reduced prior to extraction, the ethanol usage will be greatly decreased.

Ethanol and ethanol/water mixtures are most compatible with current corn wet-milling, ethanol-producing plants since both ethanol and water are available for use in such plants. Other solvents may also be used, including but not limited to hexane, ethyl ether, heptane, and supercritical $CO_2$. Oil extraction methods used to produce the feed of the invention may include extraction of corn fiber by counter-current extraction with ethanol or other solvents at temperatures near the boiling point of ethanol.

One of the key issues in designing an economical process for the hydrolysis of corn fiber is the use and availability of process water. In a plant, process water is both relatively expensive and limited. For example, corn fiber streams dewatered by the Vari-nips presses contains about 50-70% water; however, the material has little unabsorbed water. This is because the carbohydrate fractions (starch, hemicellulose, and cellulose) of the corn fiber are able to absorb large amounts of water. One skilled in the art will appreciate that to have a material that can be stirred, the moisture content of the slurry generally should be above about 80-85%. In one aspect of the invention, the process that may be used to provide the fiber of the invention may include an alternative to stirring the material by providing that the material is heated in a reactor while turning the entire reactor. The process of the present invention does not require the corn fiber slurry to be able to be stirred, therefore, does not require a large addition of water.

Another issue directly related to the amount of water contained in the corn fiber slurry is the concentration of monosaccharide or disaccharide sugars in the corn fiber hydrolysate. As the water content increases, the sugar slurry produced becomes more dilute, so that when the hydrolysate is fermented, the ethanol concentration decreases. Below 5% ethanol, it becomes uneconomical to distill the ethanol from the fermentation broth.

Other streams from the plant are often used in place of process water. In another embodiment of the present invention, alternative process streams, such as corn steep liquor and stillage, may be used in preparing the corn fiber slurry. These sources provide water, but they also contain soluble and insoluble solids at levels up to 14%, thereby influencing the mixing of corn fiber liquid slurries.

The present invention provides a feed that may be produced by a process that includes extracting sterols from corn fiber, for instance by hydrolysis of corn fiber at high solids content. One aspect of the invention may include corn fiber feed made by a process wherein the corn fiber is taken from the plant at a moisture level between about 50 to about 70%, and increasing the moisture level to about 65 to about 70%. The corn fiber is placed in a sealed, rotating reactor. Steam is then used to heat the reactor from about 130° C. to about 190° C., and preferably from about 145° C. to about 180° C. The reactor is maintained between those temperatures for at least about 1 minute and preferably from about 30 minutes to about 1 hour. The reactor is then depressurized and the corn fiber is dewatered to remove the oligosaccharide containing liquid. This may result in formation of a corn fiber slurry with a moisture content of between about 20 to about 50% solids.

The high-solids, thermochemical hydrolysis of corn fiber can take place at a range of moisture contents in the slurries from 20 to 50% solids, and a range of temperatures from about 130° C. to about 190° C. for at least one minute and more preferably from about 30 minutes to 1 hour. Once the corn fiber is thermochemically hydrolyzed, it is dewatered using a press or filtration device, such as for example but not limited to, a screw press or vacuum filter. The residual fiber after dewatering has a moisture content from about 30% to about 50% solids. This material may then optionally need to be partially dried to reduce the overall solvent usage as previously discussed herein.

The fiber is then extracted with at least one, and more preferably up to 7, volumes of from about 70% to 100% ethanol at a temperature at about 25° C. to about 75° C. for at least one minute and more preferably from about 10 minutes to about 2 hours. The corn fiber may be, for example, agitated or stirred while being extracted, or it may be extracted with a counter current extractor. After extraction, the ethanol is processed further to separate the oil.

In one aspect of the invention, the extracted corn fiber resulting from the ethanol extraction is used as a food additive or feed for animals, including but not limited to animals such as ruminants, monogastrics, and/or poultry. In a further aspect of the invention, extracted corn fiber may undergo further processing prior to sale or use as a food additive or feed. Processing may include agglomeration of the thermochemically hydrolyzed, solvent-extracted corn fiber by cubing, extruding, or pelletizing and addition of additives, or a combination of them. Processing may also include grinding the extracted corn fiber to a powder. Extracted corn fiber may also be processed into a block or tub for animal feeding. Additives may include, but are not limited to, stillage, corn steep liquor, mineral and vitamin supplements, high-protein feed ingredients, cereal meals and/or fats and/or oils.

Extracted corn fiber feed of the invention may have the following characteristics, as set forth in Table 1.

TABLE 1

Chemical Analysis of Extracted Corn Fiber Feed

| | Units | As Fed Basis | Dry Matter Basis |
|---|---|---|---|
| Moisture | % | 5.4 | |
| Protein | % | 12.6 | 13.32 |
| ADI-CP | % | 5.2 | 5.5 |
| NDI-CP | % | 6.1 | 6.45 |
| Available Protein | % | 7.4 | 7.82 |

TABLE 1-continued

Chemical Analysis of Extracted Corn Fiber Feed

| | Units | As Fed Basis | Dry Matter Basis |
|---|---|---|---|
| Adj. C. Protein | % | 6.4 | 6.77 |
| NFE | % | 60.8 | 64.27 |
| NSC | % | 26.23 | 27.73 |
| Crude Fiber | % | 23.5 | 24.84 |
| ADF | % | 34.8 | 36.79 |
| NDF | % | 60.3 | 63.74 |
| Lignin | % | 9.12 | 9.64 |
| Fat | % | 0.77 | 0.81 |
| TDN | % | 41.64 | 44.02 |
| NEL | Mcal/lb | 0.41 | 0.43 |
| NEM | Mcal/lb | 0.32 | 0.34 |
| NEG | Mcal/lb | 0.09 | 0.1 |
| Relative Feed Value | RFV | 83.15 | 87.9 |
| Ash | % | 0.26 | 0.27 |
| Calcium | % | 0.01 | 0.01 |
| Phosphorus | % | 0.02 | 0.02 |
| Copper | ppm | 7.8 | 8.25 |
| Manganese | ppm | 5.6 | 5.92 |
| Iron | ppm | 52.7 | 55.71 |
| Magnesium | % | 0.03 | 0.03 |
| Zinc | ppm | 16 | 16.91 |
| Sulfur | % | 0.15 | 0.16 |
| Potassium | % | 0.06 | 0.06 |
| Sodium | % | 0.01 | 0.01 |

In a still further aspect of the invention, extracted corn fiber feed may be produced by any method disclosed and/or claimed in U.S. patent application Ser. No. 11/084,933, filed on Mar. 21, 2005, and having a U.S. Patent Application Publication No. US 2005/0220951 (published Oct. 6, 2005), claiming priority to U.S. Provisional Patent Application No. 60/555,284, filed on Mar. 22, 2004, all of which are fully incorporated by reference herein, and having as inventors Charles Abbas, Kyle E. Beery, Thomas P. Binder, and Anne M. Rammelsberg.

As discussed more fully in the Examples below, it was found that extracted corn fiber feed of the invention exhibited relatively high, fairly rapid digestibility and acceptable protein availability. This was realized with the additional benefit of extraction of the phytosterols so that they could be put to an alternative use. Rapid digestion of fiber would be useful to the dairy industry, for instance, during early lactation, where animal intake may not have increased to meet nutrient needs, and energy intake is at a premium. These results may suggest other areas of value for the product of the invention.

The low phosphorous content of corn fiber may also offer advantages as a food additive or feed ingredient in situations where, for example, phosphorus content of manure and soil phosphorous loading are concerns. These issues are gaining prevalence with increased regulatory concerns related to environmental impact of livestock operations. In an additional aspect of the invention, the extraction may be performed on wet corn fiber. Performance of the extraction on wet fiber may have a beneficial effect on the digestibility of the extracted corn fiber feed.

Although applicants do not wish to be bound by any particular theory, it is possible that the disruption of fiber that may occur because of the thermochemical hydrolysis and extraction process increased the digestion rate of the neutral detergent fraction of feed of the invention in comparison with other corn fibers. The extent of digestion may not be different from that of other by-product corn fibers such as corn gluten feed; however, the advantage for extracted corn fiber versus wet appears potentially significant, because corn fiber is incorporated into corn gluten feed. An increased rate of fermentation could be an advantage when highly fermentable fiber is desired, or in situations where passage of feed from the rumen may substantially decrease dietary energy.

EXAMPLES

Examples 1, 2, 3 and 4 demonstrate exemplary methods for producing the extracted corn fiber food additive or animal feed of the invention. Examples 5, 6 and 7 include feed technology manufacturing evaluations and comparisons of animal feed of the invention with other forms of animal feed. Example 8 details the use of extracted corn fiber as a food ingredient.

Example 1

Extraction of High-Solids, Thermochemically Treated Corn Fiber with 95% Ethanol (Thermochemical Treatment)

Several large-scale experiments were conducted in a tumbler reactor. A tumbler reactor is a jacketed, 50-gallon pressure tank that uses rotation of the entire reactor for mixing, instead of having a rotating agitator (impeller) inside the tank. By using this method, the solids loading can be higher than the approximately 15%-solids slurry limitation when mixing by a stirrer. The method of hydrolysis is residual $SO_2$-catalyzed hydrolysis of the polysaccharides in the corn fiber, which include starch, hemicellulose and a small amount of cellulose. The residual $SO_2$ present in the corn fiber results from the corn steeping process.

For Example 1, a total of about 26.1 kg of corn fiber (42.6% solids) were hydrolyzed in a tumbler reactor in three batches. The fiber moisture level was adjusted to about 30% solids by adding about 4.35 kg of water. The slurry was brought to about 144° C. (at about 60 PSIG) and held at that temperature for about 30 minutes at about 1.3 rpm. After about 30 minutes the reactor was vented and the fiber removed and weighed. The total fiber weight was about 35.4 kg, which means that about 4.95 kg of steam condensate had been added during the run.

A screw press was used to dewater the fiber. The dry fiber was washed with a total of 10 gallons of hot deionized water and dewatered again. The total dry weight of the corn fiber after hydrolysis and washing was about 4.6 kg, which gives a total solubilization of about 58.7%. The liquid extract from the screw press had a mass of about 15.5 kg at about 20.2% solids with a pH of about 3.49.

The extract and washes were mixed and sulfuric acid was added to the mixture at a level of about 1 wt % based on the mass of the liquid. The mixture was hydrolyzed in an autoclave at about 121° C. for about 30 minutes. Table 2 shows the concentrations of the hexoses, pentoses, and other solubles in the hydrolysate mixture of Example 1. The pentoses included xylose and arabinose, and the hexoses included glucose and galactose.

TABLE 2

Analytical Results for Tumbler Reactor Extract for Example 1 (in g/L)

| Example 1 | Protein | Hexoses | Pentoses | Acetic Acid | Degradation Products |
|---|---|---|---|---|---|
| | 11.70 | 53.54 | 44.23 | 2.56 | 4.26 |

Example 2

Extraction of High-Solids, Thermochemically Treated Corn Fiber with 95% Ethanol (Oil Extraction/Counter Current Extraction)

For Example 2, the batches of hydrolyzed corn fiber from Example 1 and a portion of hydrolyzed corn fiber from an identical experiment were dried in a convection oven at about 220° C. overnight, then extracted with about 90-95% ethanol using a Crown counter-current extractor (Crown, Minneapolis, Minn.). About 3.12 kg of fiber were introduced into the extractor. Total extraction time was about 105 minutes, with a 94.6%/5.4% ethanol/water mixture used as the extractant. The drag chain was moving at approximately 1 inch per minute, with an ethanol feed rate of about 200 mL/minute. Steam heating was used to keep the extractant temperature at about 66° C. The extractor had a 20 L capacity between sections.

The extractor system was run at steady-state for about 30 minutes, then emptied. A total of about 3.1 kg of extracted fiber were collected during steady-state operation and 3.1 kg of extracted fiber were collected afterward.

After the ethanol extraction of the dried, hydrolyzed corn fiber, the ethanol-oil mixtures were concentrated by evaporating the ethanol in a vertical evaporator operating under reduced pressure. The steady-state batch was concentrated from about 3.58 kg to about 1.16 kg, and further concentrated in a Rotovap to about 90 g of oil. The sample was saponified to determine the free sterol and stanol concentration. The results, in Table 3, show that the percentage of free sterols and stanols extracted from the corn fiber varied between about 0.13% to about 0.23% in the saponified oil.

TABLE 3

Concentration of Ethanol-Extracted Corn Fiber Oil Components

| | Steady State Oil Results | |
|---|---|---|
| | ADM Results | PNNL Results |
| 1. Campesterol (wt %) | 2.02 | 1.14 |
| 2. Campestanol (wt %) | 2.39 | 1.54 |
| 3. Stigmasterol (wt %) | 1.10 | 1.12 |
| 4. Sitosterol (wt %) | 7.20 | 4.80 |
| 5. Sitostanol (Stigmastanol) (wt %) | 7.13 | 4.89 |
| Total (wt %) | 19.84 | 13.49 |
| Saponification Yield | | 26.50% |
| Oil Remaining after Saponification (g) | | 23.85 |
| Total Mass of Sterols and Stanols (g) | 1.80 | 3.22 |
| Total Corn Fiber Used (g) | 1391 | 1391 |
| % sterols and stanols extracted from corn fiber | 0.13% | 0.23% |

Example 3

Extraction of High-Solids, Thermochemically Treated Corn Fiber with 95% Ethanol (Oil Extraction/Counter Current Extraction)

The remaining dry corn fiber from Example 2 was used as the feedstock for oil extraction. The oil extraction was run in the counter-current Crown oil extractor (Crown, Minneapolis, Minn.), which was a 20 L capacity between individual sections. About 6 kg of oil were fed into the extractor, and the extraction time was about 140 minutes with 100% ethanol used as the extractant. The drag chain was moved at approximately one inch per minute. Ethanol feed rate was about 150 mL/minute. The extractant temperature was kept at about 66° C. by steam heating.

The valves on each individual section of the extractor were opened to allow pumping of the ethanol extractant along the extractor. The corn fiber was fed into the extractor and the corn fiber bed progressed as the drag chain moved. Ethanol was continually collected from the last stage of the extractor. The system was run for about 140 minutes, then emptied. About 46.4 kg of ethanol were used for the extraction, with about 29.0 kg of ethanol recovered as free ethanol; the remaining ethanol had either evaporated or been absorbed in the corn fiber. The extracted corn fiber had a mass of about 6.31 kg before drying and about 5.15 kg after drying.

The ethanol extracts (about 29.0 kg) were concentrated by evaporation under reduced pressure to about 659.6 g. The ethanol extracts were then analyzed for determination of concentrations of mono-, di- and tri-glycerides, as well as cholesterol, brassicasterol, campesterol, campestanol, stigmasterol, sitosterol, and sitostanol. The results of the analysis are shown in Table 4. The yield of about 0.29% total free phytosterols extracted from the starting corn fiber was in the expected range of about 0.2 to about 0.6% total free phytosterols in the starting corn fiber. As can be expected, the sitosterol and sitostanol were the largest constituents of the sterol and stanol portion of the extracted oil. The results were similar to the extraction of Example 2, with a similar composition seen in the sterol and stanol component of the oil. The overall percent sterols and stanols extracted from the hydrolyzed corn fiber was slightly higher than the previous corn fiber extraction, which was likely due to improved handling of the oil extract during solvent removal, since conditions were nearly the same for both extraction experiments.

TABLE 4

Sterol and Stanol Results from Example 3

| | Wt. % of product based on Saponified Oil | | | |
|---|---|---|---|---|
| | Replicate 1 | Replicate 2 | Replicate 3 | Average |
| 1. Campesterol | 0.95 | 1.01 | 1.05 | 1.00 |
| 2. Campestanol | 1.75 | 1.83 | 1.80 | 1.79 |
| 3. Stigmasterol | 1.09 | 1.20 | 1.05 | 1.12 |
| 4. Sitosterol | 5.04 | 5.05 | 5.25 | 5.11 |
| 5. Sitostanol (Stigmastanol) | 6.26 | 6.27 | 6.31 | 6.28 |
| Total Sterol and Stanols | 15.09 | 15.35 | 15.46 | 15.30 |

TABLE 4-continued

Sterol and Stanol Results from Example 3

| | Wt. % of product based on Saponified Oil | | | |
|---|---|---|---|---|
| | Replicate 1 | Replicate 2 | Replicate 3 | Average |
| Saponified oil yield based on crude oil | 34% | 34% | 34% | 34% |
| Oil Remaining after Saponification (g) | 224.27 | 224.27 | 224.27 | 224.27 |
| Total Mass of Sterols and Stanols | 33.83 | 34.44 | 34.66 | 34.31 |
| Mass of Corn Fiber Extracted (g) | 6000 | 6000 | 6000 | 6000 |
| % sterols and stanols extracted from hydrolyzed corn fiber | 0.56 | 0.57 | 0.58 | 0.57 |
| % sterols and stanols extracted from starting corn fiber | 0.28 | 0.29 | 0.29 | 0.29 |

Example 4

Extraction of High-Solids, Thermochemically Treated Corn Fiber with 100% Ethanol in a Continuous Countercurrent Extractor Further large-scale experiments have been conducted in a tumbler reactor. The method of hydrolysis is residual $SO_2$-catalyzed hydrolysis of the polysaccharides in the corn fiber, which include starch, hemicellulose and a small amount of cellulose. In runs #4232-72-1 through #4232-72-9, the fiber was placed into a 50-gallon tumbler reactor, and the pressure in the reactor and jacket was increased to approximately 60 psi, which corresponds to about 145° C. For each of the nine runs, the reactor was kept at pressure and rotated at 1 rpm for 30 minutes and then depressurized and shut down. The fiber slurry was immediately dewatered by processing the slurry through a screw press. The fiber residue was then washed twice with an excess of hot water (having a temperature of about 50° C. to about 100° C.) and the wash water was removed by a screw press and collected. The liquid hydrolysates and washes from Runs #4232-72-1 through #4232-72-9 were collected and subjected to a secondary acid hydrolysis step (1% $H_2SO_4$ at 121° C. for 30 minutes) in a 50 gallon stirred reactor to hydrolyze the oligosaccharides present in solution to monosaccharides to produce a fermentation feedstock. The details of each run are shown in Table 5.

TABLE 5

Details of Runs #4232-72-1 through #4232-72-9

| | Run #4232 | | | | | | | | |
|---|---|---|---|---|---|---|---|---|---|
| | -72-1 | -72-2 | -72-3 | -72-4 | -72-5 | -72-6 | -72-7 | -72-8 | -72-9 |
| Mass of Initial Fiber | 11.1 | 11.8 | 9.7 | 10.8 | 10.6 | 11.8 | 10.6 | 11.3 | 10.9 |
| Temperature (C.) @60 psi | 145 | 145 | 145 | 145 | 145 | 145 | 145 | 145 | 145 |
| Mass of Hydrolyzed Fiber | 12.2 | 13.3 | 11.8 | 12.5 | 11.9 | 14.0 | 12.5 | 12.5 | 12.2 |
| Mass of Hydrolysate | 4.3 | 4.2 | 5.0 | 5.3 | 4.4 | 4.6 | 4.6 | 3.9 | 3.9 |

TABLE 5-continued

Details of Runs #4232-72-1 through #4232-72-9

| | Run #4232 | | | | | | | | |
|---|---|---|---|---|---|---|---|---|---|
| | -72-1 | -72-2 | -72-3 | -72-4 | -72-5 | -72-6 | -72-7 | -72-8 | -72-9 |
| Mass of Wash Water | 13.1 | 15.4 | 15.0 | 14.5 | 13.0 | 13.2 | 14.1 | 13.4 | 14.3 |
| Mass of Fiber Residue | 5.9 | 5.6 | 4.8 | 5.3 | 4.8 | 5.9 | 5.3 | 5.7 | 5.3 |
| Mass of Wash | 14.5 | 15.8 | 15.9 | 14.8 | 13.4 | 14.1 | 14.8 | 14.1 | 16.6 |
| Moisture of Initial Sample | 57.5% | 57.5% | 57.5% | 59.9% | 59.9% | 58.8% | 58.8% | 59.4% | 59.7% |
| Moisture of Hydrolysate | 77.7% | 79.9% | 79.2% | 78.4% | 78.0% | 78.3% | 77.6% | 76.6% | 75.5% |
| Moisture of Wash | 95.7% | 96.9% | 96.7% | 96.1% | 95.8% | 94.9% | 95.2% | 94.7% | 94.5% |
| Moisture of Final Fiber Residue | 58.2% | 55.8% | 57.7% | 60.6% | 57.1% | 54.8% | 56.2% | 59.6% | 61.8% |
| Solubilization | 47.8% | 56.6% | 47.7% | 52.3% | 51.4% | 44.9% | 47.1% | 50.0% | 54.2% |

The pooled, secondary acid hydrolyzed corn fiber hydrolysate was concentrated in a forced circulation, long-tube vertical evaporator to a solids concentration of 31%. The analytical results from the pooled hydrolysate are shown in Table 6 below. The pooled liquid is designated below as Run #4232-72. The high levels of ash are due mainly to the sulfur in the $SO_2$ plus the sulfuric acid added during the secondary hydrolysis step for the purpose of completely hydrolyzing the oligosaccharides. The pentoses include xylose, arabinose and fructose; and the hexoses include glucose, mannose and galactose.

The thermochemically hydrolyzed corn fiber residue from Run #4232-72 (44.8 kg of 56% moisture, 25.09 kg dry weight) was extracted with 99.9% ethanol in a six-stage Crown counter-current extractor. The extractor was operated with ethanol at 150° F. (65.6° C.), a feed rate of 200 mL/min of ethanol, and a chain drag speed of approximately 1.5 inches/min (3.81 cm/min). The fiber was added to the chain drag up to the top of each section as the chain passed the feed opening. 50 gallons (189.2 liters) of ethanol were utilized to extract the fiber. After the fiber was extracted, it immediately entered a desolventizer (DT) where it was heated and agitated with two ribbon mixers to evaporate the ethanol. The ethanol entered a condenser and was pumped back to the last stage of the extractor (where the fresh ethanol entered). The DT was kept at 140° F. (60° C.) with steam heating and was operating under reduced pressure, so that the ethanol vapors would enter the condenser. The ethanol from the extractor was collected for further treatment.

The oil-containing ethanol from the extraction was concentrated in a forced circulation, long-tube vertical evaporator with pumps on the inlet and outlet for continuous operation. The 50 gallons (189.2 L) of ethanol used for extraction absorbed the water present in the corn fiber, so the volume was increased to 55 gallons (208.2 L). The evaporator was operated at 1 PSIG (108 kPa) steam pressure, −24 in. Hg (20 kPa), and a liquid temperature of 115-120° F. (46-49° C.). The 55 gallons of ethanol/oil extract (208.2 L) were fed into the evaporator and evaporated to a total of 3 gallons (11.4 L). The evaporated ethanol was collected and stored. The concentrated oil extract was fed into a smaller natural circulation evaporator. The 3 gallons (11.4 L) of concentrated oil extract were concentrated to 2.84 kg of oil extract. The concentrations of sterols in the oil extract are shown in Table 7, before and after saponification. The highest concentrations of free phytosterols are Sitosterol and Sitostanol as expected. In the oil compositions shown in Table 8, the prevalent component is Triglycerides followed by Free Fatty Acids. The analysis of the oil was used to determine the percent oil extracted and percent phytosterol extracted. The mass of the oil concentrate extracted from the fiber was 2.42 kg, and the estimated mass of starting native fiber, after processing losses through the screw press and reactor, is 40.6 kg. This gives an oil yield of 4.7% and a phytosterol yield of 0.55%.

TABLE 6

Pooled, Secondary Acid Hydrolyzed Corn Fiber Hydrolysate Concentrate for Run #4232-72

| Run ID | Protein | Hexoses | Pentoses | Acetic | HMF | Furfural | Ash | Total Organic Carbon |
|---|---|---|---|---|---|---|---|---|
| 4232-72 | 32.5 | 67 | 103 | 4.4 | 0.4 | 0.05 | 16.8 | 132 |

TABLE 7

Sterol Concentrations in Corn Fiber Oil Sample (g/L)

| | 4232-172 Oil Extract after saponification | 4232-172 Oil Extract |
|---|---|---|
| Campesterol | 8.49 | 4.23 |
| Campestanol | 8.53 | 1.34 |
| Stigmasterol | 4.87 | 4.34 |
| Sitosterol | 32.34 | 18.85 |
| Sitostanol | 24.88 | 4.16 |
| Total Sterols | 79.11 | 32.92 |

TABLE 8

Oil Component Concentrations (g/L)

| Sample Id | 4232-172 Oil Extract |
|---|---|
| Total Free Fatty Acids | 118.9 |
| Total Monglycerides | 3.7 |
| Total Diglycerides | 16.0 |
| Total Triglycerides | 457.9 |

Example 5

Feed Manufacturing Testing of Thermochemically Hydrolyzed, Extracted Corn Fiber Residue—Comparison to Native Corn Fiber

Samples of corn fiber subjected to an extraction process were subjected to testing for bulk density and liquid holding capacity. Liquid holding capacity was measured by incremental addition of liquid to known quantities of fiber and measuring hydration characteristics defined by objective and subjective criteria. Liquid holding capacity was calculated using the following equation: grams of liquid/(grams of liquid+grams of fiber)×100. Subjective measurements included observations of swelling, compaction, balling, and clumping. The results of testing are presented in Table 9. Hydrolysis and extraction processing considerably increased the bulk density of corn fiber, which presents advantages for handling and transportation of fibers in the feed manufacturing process. Thermochemical hydrolysis and extraction diminished to some extent the liquid holding capacity of the fiber with the degree of liquid absorption dependent on the nature of liquid applied. The results of this study demonstrated that processed corn fiber had greater bulk density with only a slight reduction in liquid holding capacity compared with native corn fiber.

In Situ Analysis

Ruminal fiber and protein digestion of corn fiber samples were evaluated for ruminant application. Samples of corn fiber were incubated in situ for 0, 4, 8, 16, 24, 48, 72, and 96 hours. Samples were placed in the rumens of dairy cattle receiving a lactation ration, with a minimum of three animals used. Samples were fermented in duplicate.

In Vitro Analysis

Isolated neutral detergent fiber (NDF) was obtained from extracted corn fiber. Samples of extracted corn fiber, isolated NDF from corn fiber, medium-quality grass hay, soyhulls, and wheat straw were fermented in vitro. In vitro gas production was monitored for 48 hours and residual NDF digestion was determined. Samples were fermented in duplicate using rumen fluid from dairy cattle receiving a lactation ration. Kinetic analysis of fiber digestion was evaluated.

Chemical analysis of the corn fiber samples indicated a fibrous byproduct with relatively low protein as compared to corn gluten feed or common dry forages fed to ruminants, as shown in Table 10. Of course, the data in Table 10 are given by way of example only, and should not be construed to limit the scope of the claims. Analysis suggested substantial amounts of lignin and fiber-bound protein (NDI-CP, ADI-CP). The large discrepancy between the NFE and NSC values is consistent with fibrous material with variable solubility under basic assays and the presence of Maillard products. Those skilled in the art will recognize Maillard products as those products formed by the Maillard Reaction, which is a non-enzymatic browning reaction between an amino acid and a sugar, usually requiring the addition of heat. The energy values as calculated by a regression equation reflect the high fiber-bound protein and lignin analysis with relatively low values (TDN, Nel, Nem, Neg, RFV).

TABLE 9

Feed Manufacturing Characteristics of Hydrolyzed and Extracted Corn Fiber

| | | LHC[1] | LHC at 24 hours | | | | |
|---|---|---|---|---|---|---|---|
| | Bulk density, lb/ft$^3$ | Initial observation Water | Water | Mineral oil | Corn steep liquor | Glycerin | Threonine fermentation liquor |
| Corn Fiber | 7.2 | 71 | 75 | 67 | 60 | 60 | 67 |
| Hydrolyzed Corn Fiber | 12.1 | 56 | 60 | 43 | 56 | 43 | 50 |
| Hydrolyzed and Extracted Corn Fiber | 18.5 | 60 | 60 | n.m. | n.m. | n.m. | n.m. |

[1]Liquid Holding Capacity. Calculated using swelling as the measurement criterion with numeric value assigned using the equation: grams of liquid/(grams of liquid + grams of fiber) × 100
n.m. = not measured due to insufficient material for testing.

Example 6

Animal Nutrition Testing of Thermochemically Hydrolyzed, Extracted Corn Fiber Residue—Comparison to Other Feeds

Samples of corn fiber subjected to an extraction process like that in the previous Examples were subjected to testing for analysis of CNCPS chemical profile, as well as analysis for crude fiber, crude fat, NFE, TDN, and RFV. All analysis were performed by a standard wet chemistry method known to those of skill in the art.

TABLE 10

Chemical Analysis of Extracted Corn Fiber Feed

| | Units | As Fed Basis | Dry Matter Basis |
|---|---|---|---|
| Moisture | % | 5.4 | |
| Protein | % | 12.6 | 13.32 |
| ADI-CP | % | 5.2 | 5.5 |

TABLE 10-continued

Chemical Analysis of Extracted Corn Fiber Feed

|  | Units | As Fed Basis | Dry Matter Basis |
|---|---|---|---|
| NDI-CP | % | 6.1 | 6.45 |
| Available Protein | % | 7.4 | 7.82 |
| Adjusted Crude Protein | % | 6.4 | 6.77 |
| NFE | % | 60.8 | 64.27 |
| NSC | % | 26.23 | 27.73 |
| Crude Fiber | % | 23.5 | 24.84 |
| ADF | % | 34.8 | 36.79 |
| Adjusted NDF | % | 60.3 | 63.74 |
| Lignin | % | 9.12 | 9.64 |
| Fat | % | 0.77 | 0.81 |
| TDN | % | 41.64 | 44.02 |
| NEL | Mcal/lb | 0.41 | 0.43 |
| NEM | Mcal/lb | 0.32 | 0.34 |
| NEG | Mcal/lb | 0.09 | 0.1 |
| Relative Feed Value | RFV | 83.15 | 87.9 |
| Ash | % | 0.26 | 0.27 |
| Calcium | % | 0.01 | 0.01 |
| Phosphorus | % | 0.02 | 0.02 |
| Copper | ppm | 7.8 | 8.25 |
| Manganese | ppm | 5.6 | 5.92 |
| Iron | ppm | 52.7 | 55.71 |
| Magnesium | % | 0.03 | 0.03 |
| Zinc | ppm | 16 | 16.91 |
| Sulfur | % | 0.15 | 0.16 |
| Potassium | % | 0.06 | 0.06 |
| Sodium | % | 0.01 | 0.01 |

In situ digestion of the extracted corn fiber provided variable results for rate of fermentation (kd), but indicated the material was very digestible, with extent of digestion exceeding 90% as an average of the two samples assayed. The high fiber digestibility is in contrast to the energetic values obtained by regression in the standard assays. Table 11 gives values for in situ digestion of corn fiber feed samples of the invention.

TABLE 11

In Situ Digestion of Extracted Corn Fiber

| Sample | Available Fraction, % | Digestion Rate, $h^{-1}$ | Lag, h | Total Disappearance, % |
|---|---|---|---|---|
| NDF Digestion | | | | |
| Corn Fiber 1 | 84.4 | 0.044 | 5.0 | 93.7 |
| Corn Fiber 2 | 79.1 | 0.090 | 5.8 | 89.1 |
| Grass Hay | 45.1 | 0.056 | 1.58 | 52.0 |
| Dry Matter (DM) Digestion | | | | |
| Corn Fiber 1 | 93.6 | 0.041 | 1.9 | 95.9 |
| Corn Fiber 2 | 88.9 | 0.066 | 2.7 | 91.2 |
| Grass Hay | 40.8 | 0.069 | 0.7 | 61.6 |
| Protein Digestion | | | | |
| Corn Fiber 1 | 66.1 | 0.052 | 11.4 | 85.6 |
| Corn Fiber 2 | 64.2 | 0.071 | 6.14 | 86.9 |
| Grass Hay | 50.1 | 0.113 | 2.66 | 73.5 |

In situ values suggested rates of thermochemically treated, solvent-extracted corn fiber digestion in excess of the grass hay sample included as a control. In vitro gas production confirmed the rapid digestion of the thermochemically treated, solvent-extracted corn fiber. In vitro gas production of the intact and neutral detergent thermochemically treated, solvent extracted corn fiber of the invention was considerably more rapid than soyhulls or the grass hay included in the test. Table 12 includes a kinetic analysis of in vitro gas production from corn fiber feed samples of the invention.

TABLE 12

Kinetic Analysis of In Vitro Gas Production from Thermochemically Treated, Solvent-Extracted Corn Fiber

| Sample | Total Volume, ml | Fast Volume, % | Fast Rate, $h^{-1}$ | Slow Rate, $h^{-1}$ | Lag, h |
|---|---|---|---|---|---|
| Corn Fiber | 93.1 | 87.6 | 0.117 | 0.031 | 4.3 |
| Corn Fiber NDF | 94.4 | 88.6 | 0.156 | 0.040 | 4.2 |
| Soyhulls | 76.1 | 19.7 | 0.241 | 0.056 | 1.6 |
| Grass | 48.2 | 27.7 | 0.136 | 0.049 | 1.8 |

[1]Gas Production results analyzed using the 2-pool logistic model.
[2]Kinetic parameters, Total volume = ml final gas volume (48 h), fast volume = the % of gas production associated with the greater kinetic rate, fast and slow rate = the more rapid and slower kinetic gas pools, respectively.

The digestion rate was somewhat higher for the detergent-extracted fiber sample, which could be related to extraction with NDF solution or indicate a small amount of interference from the solubles. Gas production results of the intact and detergent-extracted fiber were similar.

The extracted corn fiber feed of the invention was more rapidly digestible than expected. The level of NDF in the sample and in situ extent of digestion are comparable to soyhull values. However, the rate and final gas volume produced were considerably greater than soyhulls, perhaps 80-90% of the values expected from corn starch. A rapidly digested fiber source such as this may be useful to ruminants in general and may also be useful as a food additive or in monogastric or other animal diets Example 7

Animal Nutrition Testing of Thermochemically Hydrolyzed, Extracted Corn Fiber Residue—Comparison to Other By-Product Fibers The purpose of the tests performed in Example 6 was to provide comparisons with other by-product fibers to confirm the high digestibility of the feed product of the present invention. Samples evaluated were corn gluten feed (CGF), wet corn fiber, the thermochemically hydrolyzed and extracted corn fiber feed of the invention, soy hulls, and corn starch. In vitro gas production was used to evaluate the kinetic characteristics of the samples. Fiber digestion in vitro and in situ were measured to evaluate fiber digestion of the samples within a diet mixture.

Table 13 shows data from gas production and kinetics of simulated digestion of an example of the extracted corn fiber feed of the invention. The volume of gas production from the thermochemically treated, solvent-extracted corn fiber was similar to that of the isolated NDF fraction of wet corn fiber and CGF. The fiber samples typically produced about 80 to about 84% of the gas volume observed from the corn starch sample. Extracted corn fiber fermented considerably more rapidly than the fibrous samples in this experiment (isolated NDF samples, corn fiber, or soyhulls) and was comparable to the intact CGF which would contain some residual starch. There was also a shift in the shape of the fermentation curve due to processing. Corn fiber tended to have an exponential character with minimal lag, whereas the extracted material exhibited a more logistic curve form with a small (about 2 to about 3 hours) lag.

TABLE 13

Gas Production and Kinetics of Corn Fiber Digestion in an In Vitro System Designed to Simulate Rumen Fermentation

| | Corn Fiber | | Corn Gluten Feed | | Extracted Corn Fiber | | Soyhulls | Corn Starch | SE |
|---|---|---|---|---|---|---|---|---|---|
| | CF | NDF | CGF | NDF | XCF | NDF | | | |
| Gas Production, ml/100 mg | | | | | | | | | |
| 24 h | 46.2 | 38.9 | 34.4 | 39.4 | 39.3 | 40.4 | 40.8 | 50.6 | 1.4 |
| 48 h | 53.5 | 41.9 | 38.1 | 43.6 | 41.3 | 42.7 | 43.6 | 52.2 | 1.6 |
| Rate Calculations, Exponential | | | | | | | | | |
| Predicted Volume, ml | 46.5 | 52.5 | 33.5 | 43.0 | 40.4 | 41.4 | 45.7 | 50.2 | 1.6 |
| Rate, %/h | 12.9 | 5.8 | 18.5 | 9.8 | 18.1 | 17.4 | 9.8 | 25.8 | 1.6 |
| Lag, h | 0 | 0 | 0 | 0 | 3.0 | 1.5 | 1.0 | 0.4 | 0.6 |
| Rate Calculations, 2-Pool Logistic Function | | | | | | | | | |
| Predicted Volume, ml | 49.0 | 40.9 | 35.0 | 41.2 | 51.2 | 46.4 | 42.1 | 50.9 | 5.7 |
| % Fast | 43.8 | 15.1 | 53.9 | 38.9 | 27.2 | 77.2 | 25.9 | 78.0 | 9.7 |
| Fast Rate | 0.182 | 0.283 | 0.206 | 0.190 | 0.367 | 0.114 | 0.239 | 0.308 | 0.09 |
| Slow Rate | 0.043 | 0.054 | 0.050 | 0.048 | 0.047 | 0.040 | 0.057 | 0.059 | 0.013 |
| Lag | 0.01 | 1.37 | 0.02 | 0.65 | 1.92 | 2.39 | 0.72 | 0.81 | 0.33 |
| 48 hour Fiber Digestion | | | | | | | | | |
| pH | 6.50 | 6.04 | 6.36 | 6.11 | 6.06 | 6.09 | 6.38 | 6.00 | — |
| NDF, % of NDF | 77.9 | 87.5 | 80.4 | 84.4 | 79.1 | 81.5 | 87.3 | — | 1.9 |
| DMD, % of DM | 55.8 | 71.7 | 74.6 | 72.3 | 67.0 | 68.3 | 77.1 | 91.9 | 4.1 |
| IVTD, % of DM | 83.5 | 88.4 | 92.1 | 88.7 | 84.4 | 84.6 | 93.9 | — | 1.4 |

CF = Corn Fiber,
XCF = Extracted Corn Fiber Feed of the Invention

In vitro and in situ fiber digestions confirm increased digestion rate with improved extent of fiber digestion of extracted corn fiber when compared with wet corn fiber. A sample comparison is shown in Table 14, below. The extent of fiber digestion after about 48 hours was similar to CGF but lower than soyhulls. The results of the chemical analyses of the tested materials are shown in Table 15, below. The thermochemically hydrolyzed, extracted corn fiber feed used in this example has much lower levels of phosphorous and potassium than either native corn fiber or corn gluten feed.

TABLE 14

In vitro and In situ Digestion of Corn Fiber Samples

| Time of Incubation | Corn Fiber | | Corn Gluten Feed | | Extracted Corn Fiber | | Soyhulls | SE |
|---|---|---|---|---|---|---|---|---|
| | CF | NDF | CGF | NDF | XCF | NDF | | |
| In Vitro NDF Digestion, % | | | | | | | | |
| 4 h | 16.9 | 8.7 | 21.6 | 6.1 | 22.1 | 18.6 | 3.9 | 2.0 |
| 8 h | 27.2 | 15.1 | 33.8 | 14.7 | 28.6 | 24.8 | 19.8 | 2.1 |

TABLE 14-continued

In vitro and In situ Digestion of Corn Fiber Samples

| Time of Incubation | Corn Fiber | | Corn Gluten Feed | | Extracted Corn Fiber | | Soyhulls | SE |
|---|---|---|---|---|---|---|---|---|
| | CF | NDF | CGF | NDF | XCF | NDF | | |
| 16 h | 37.4 | 28.8 | 50.7 | 30.0 | 38.6 | 46.2 | 46.3 | 2.4 |
| 24 h | 46.9 | 38.0 | 60.8 | 33.8 | 54.2 | 53.9 | 71.5 | 2.3 |
| 48 h | 66.9 | 38.0 | 60.8 | 33.8 | 54.2 | 53.9 | 71.5 | 2.3 |
| In Situ NDF Digestion, % | | | | | | | | |
| 24 h | 33.6 | — | 54.0 | — | 58.5 | — | 62.4 | 1.7 |
| 48 h | 60.0 | — | 73.6 | — | 84.2 | — | 86.1 | 1.9 |
| In Situ Protein Bypass | | | | | | | | |
| 16 h RUP, % of CP | 26.7 | | 8.8 | | 57.6 | | 22.4 | 1.6 |

RUP = Rumen Undigested Protein

TABLE 15

Chemical Analysis of Experimental Samples

| Components | Corn Starch DM | Soyhulls DM | Corn Fiber (CF) DM | Extracted Corn Fiber (XCF) DM | Corn Gluten Feed (CGF) DM | Isolated NDF CF DM | Isolated NDF XCF DM | Isolated NDF CGF DM |
|---|---|---|---|---|---|---|---|---|
| % Dry Matter | 89.2 | 91.0 | 42.0 | 95.6 | 90.5 | 95.6 | 92.4 | 92.0 |
| % Crude Protein | 0.5 | 28.6 | 11.4 | 13.8 | 27.1 | 8.0 | 19.8 | 22.5 |
| % ADF | 0.2 | 30.1 | 17.7 | 35.6 | 11.4 | 23.7 | 42.5 | 24.0 |
| % NDF | 0.6 | 42.1 | 59.7 | 61.0 | 34.1 | 84.2 | 72.4 | 68.7 |
| % NFC | | 22 | | | 35 | | | |
| % TDN | 90 | 68 | 68 | 68 | 73 | 64 | 67 | 67 |
| NEL, Mcal/kg | 2.07 | 1.56 | 1.61 | 1.61 | 1.70 | 1.50 | 1.56 | 1.56 |
| % Calcium | 0 | 0.58 | 0.07 | 0.02 | 0.15 | 0.05 | 0.03 | 0.04 |
| % Phosphorus | 0.02 | 0.38 | 0.14 | 0.02 | 1.04 | 0.04 | 0.01 | 0.03 |
| % Magnesium | 0 | 0.28 | 0.07 | 0.03 | 0.33 | 0.03 | 0.01 | 0.02 |
| % Potassium | 0.01 | 1.79 | 0.38 | 0.10 | 1.16 | 0.07 | 0.02 | 0.01 |

Example 8

Production of a Food Fiber by Thermochemical Hydrolysis and Extraction of Corn Fiber Further large-scale experiments have been conducted in a tumbler reactor. The method of hydrolysis is residual $SO_2$-catalyzed hydrolysis of the polysaccharides in the corn fiber, which include starch, hemicellulose and a small amount of cellulose. Ten experiments were conducted. Corn fiber was placed into a 50-gallon tumbler reactor, and the pressure in the reactor and jacket was increased to approximately 60 psi, which corresponds to about 145° C. For each of the ten runs, the reactor was kept at pressure and rotated at 1 rpm for 30 minutes and then depressurized and shut down. The fiber slurry was immediately dewatered by processing the slurry through a screw press. The fiber residue was then washed twice with an excess of hot water (having a temperature of about 50° C. to about 100° C.) and the wash water was removed by a screw press and collected. The liquid hydrolysates and washes (a total of 364.5 lb (165.3 kg)) were collected and subjected to a secondary acid hydrolysis step (1% $H_2SO_4$ at 121° C. for 30 minutes) in a 50 gallon stirred reactor to hydrolyze the oligosaccharides present in solution to monosaccharides to produce a fermentation feedstock.

The thermochemically hydrolyzed corn fiber residue from the ten runs (43.6 kg of 38.1% moisture, 27.0 kg dry weight) was extracted with 95% ethanol in a six-stage Crown countercurrent extractor. The extractor was operated with ethanol at 150° F. (65.6° C.), a feed rate of 200 mL/min of ethanol, and a chain drag speed of approximately 1.5 inches/min (3.81 cm/min). The fiber was added to the chain drag up to the top of each section as the chain passed the feed opening. 80 gallons (302.8 liters) of ethanol were utilized to extract the fiber. After the fiber was extracted, it immediately entered a desolventizer (DT) where it was heated and agitated with two ribbon mixers to evaporate the ethanol. The ethanol entered a condenser and was pumped back to the last stage of the extractor (where the fresh ethanol entered). The DT was kept at 140° F. (60° C.) with steam heating and was operating under reduced pressure, so that the ethanol vapors would enter the condenser. The ethanol from the extractor was collected for further treatment.

The oil-containing ethanol from the extraction was concentrated in a forced circulation, long-tube vertical evaporator with pumps on the inlet and outlet for continuous operation. The 80 gallons (302.8 L) of ethanol used for extraction absorbed the water present in the corn fiber, so the volume was increased to 85 gallons (321.8 L). The evaporator was operated at 1 PSIG (108 kPa) steam pressure, −24 in. Hg (20 kPa), and a liquid temperature of 115-120° F. (46-49° C.). The 85 gallons of ethanol/oil extract (321.8 L) were fed into the evaporator and evaporated to a total of 10 gallons (37.9 L). The evaporated ethanol was collected and stored. The concentrated oil extract was fed into a smaller natural circulation evaporator. The 10 gallons (37.9 L) of concentrated oil extract were concentrated to 2.56 kg of oil extract. The concentrations of sterols in the oil extract are shown in Table 16. The highest concentrations of free phytosterols are Sitosterol and Sitostanol as expected. In the oil compositions shown in Table 17, the prevalent component is Triglycerides followed by Free Fatty Acids. The analysis of the oil was used to determine the percent oil extracted and percent phytosterol extracted. The mass of the oil concentrate extracted from the fiber was 2.56 kg, and the estimated mass of starting native fiber is 54.0 kg. This gives an Oil Extract yield of 4.7%, and Oil yield of 1.9% and a phytosterol yield of 0.11%.

TABLE 16

Sterol Concentrations in Extracted Oil

| Components (g/L) | Oil Extract |
|---|---|
| Brassicasterol Concentration | 0.16 |
| Campesterol Concentration | 2.11 |
| Campestanol Concentration | 2.35 |
| Stigmasterol Concentration | 1.11 |
| Sitosterol Concentration | 8.96 |
| Sitostanol (Stigmastanol) Concentration | 7.58 |

TABLE 17

Composition of Oil Extract

| Components (%) | Oil Extract |
| --- | --- |
| Monoglycerides | 0.6 |
| Diglycerides | 1.8 |
| Triglycerides | 16.6 |
| Free fatty acids | 2.2 |
| Sterols | 2.2 |
| Arabinose | 2.8 |
| Protein | 9.7 |
| Ethanol | 14.2 |
| Moisture | 32.5 |

The thermochemically hydrolyzed, extracted corn fiber was collected and ground. This ground corn fiber can be used in baking or other food applications. The fiber was analyzed for dietary fiber percentage, aflatoxin concentration, pesticide residues, remaining fat, metals and ions, and for microorganisms and spores, which are shown in Table 18. The pesticide residue analysis came back as none detected. The sieve analysis of the ground fiber is shown in Table 19.

TABLE 18

Edible Corn Fiber Composition

| 4533-154-1 Corn Fiber Edible Fiber (mg/kg) | B 22.28 S 1993.00 Ni 3.13 | Na 52.20 Cr 5.68 Cu 9.25 | Mg 291.90 Mn 2.17 Cl 2.21 | Al 6.84 Fe 116.20 Pb 0.99 | P 119.30 Co 0.06 Sn 2.21 |
| --- | --- | --- | --- | --- | --- |

| | aflatoxin ppb | Free Fatty Acid % | % Moisture | Dietary Fiber % |
| --- | --- | --- | --- | --- |
| Edible fiber | ND* | <0.01 | 1.36 | |

| | Spore Count/g | Salmonella | Yeast and Molds/g | Coliforms/g | E. Coli |
| --- | --- | --- | --- | --- | --- |
| Microbiological | 200 | NEG | <3 | <3 | NEG |

TABLE 19

Edible Corn Fiber Sieve Analysis

| Sieve Mesh Number | Sample 1, % | Sample 2, % |
| --- | --- | --- |
| 20 | 2 | 5 |
| 40 | 12 | 14 |
| 60 | 80 | 76 |
| 80 | 5 | 4 |
| 100 | 1 | 1 |

The methods and processes illustratively described herein may be suitably practiced in differing orders of steps. They are not necessarily restricted to the orders of steps indicated herein or in the claims.

As used herein and in the appended claims, the singular forms "a," "an," and "the" include plural reference unless the context clearly dictates otherwise.

Under no circumstances may the patent be interpreted to be limited to the specific examples or aspects or methods specifically disclosed herein. Under no circumstances may the patent be interpreted to be limited by any statement made by any Examiner or any other official or employee of the Patent and Trademark Office unless such statement was specifically and without qualification or reservation expressly adopted by Applicants in a responsive writing specifically relating to the application that led to this patent prior to its issuance.

The terms and expressions employed herein have been used as terms of description and not of limitation, and there is no intention in the use of such terms and expressions, or any portions thereof, to exclude any equivalents now known or later developed, whether or not such equivalents are set forth or shown or described herein or whether or not such equivalents are viewed as predictable, but it is recognized that various modifications are within the scope of the invention claimed, whether or not those claims issued with or without alteration or amendment for any reason. Thus, it shall be understood that, although the present invention has been specifically disclosed by preferred embodiments and optional features, modifications and variations of the inventions embodied therein or herein disclosed can be resorted to by those skilled in the art, and such modifications and variations are considered to be within the scope of the inventions disclosed and claimed herein.

Specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. Where examples are given, the description shall not be construed to include but not to be limited to only those examples. It will be readily apparent to one skilled in the art that varying substitutions and modifications may be made to the invention disclosed herein without departing from the scope and spirit of the invention, and from the description of the inventions, including those illustratively set forth herein, it is manifest that various modifications and equivalents can be used to implement the concepts of the present invention without departing from its scope. A person of ordinary skill in the art will recognize that changes can be made in form and detail without departing from the spirit and the scope of the invention. The described embodiments are to be considered in all respects as illustrative and not restrictive. Thus, for example, additional embodiments are within the scope of the invention and within the following claims.

What is claimed is:

1. A method for making an animal feed or a food additive, comprising the steps of:

obtaining a corn fiber slurry having a moisture content from about 30 weight percent to about 50 weight percent solids;

thermochemically processing said corn fiber slurry to produce a hydrolyzed corn fiber;

dewatering said hydrolyzed corn fiber slurry to achieve a first residual corn fiber, said first residual corn fiber having a moisture content from about 30 to about 80 weight percent solids;

washing said first residual corn fiber;

dewatering said washed, hydrolyzed corn fiber slurry to achieve a second residual corn fiber, said second residual corn fiber having a moisture content from about 30 to about 80 weight percent solids;

extracting said second residual corn fiber with an extractant and separating at least one phytosterol from said second residual corn fiber to achieve an extracted corn fiber;

collecting said extracted corn fiber; and making an animal feed or a food additive comprising said extracted corn fiber.

2. The method of claim 1 including wherein said extractant is ethanol.

3. The method of claim 1 including the step of agglomerating, or compacting said extracted corn fiber.

4. The method of claim 1 including the step of grinding said extracted corn fiber into a powder.

5. The method of claim 1 comprising the step of adding a liquid to said extracted corn fiber.

6. The method of claim 1, further comprising the step of adding corn steep liquor to said extracted corn fiber.

7. The method of claim 1 comprising the step of adding stillage to said extracted corn fiber.

8. The method of claim 1 comprising the step of adding one or more minerals, vitamins, and/or proteins to said extracted corn fiber.

9. The method of claim 1 comprising the step of adding cereal grains to said extracted corn fiber.

10. The method of claim 1 comprising the step of adding fats and/or oils to said extracted corn fiber.

11. The method of claim 1 including wherein said thermochemically hydrolyzed, solvent-extracted corn fiber is a food additive.

12. The method of claim 1 including wherein said animal feed is fed to a ruminant, mongastric, poultry, or aquaculture.

13. The method of claim 1 comprising the step of adding water to said corn fiber slurry to reach a moisture content of about 30 to 35 weight percent solids.

14. The method of claim 1 including wherein said thermochemically processing step includes the steps of:
    placing said corn fiber slurry in a reactor;
    heating the corn fiber in said reactor to a temperature between about 138° C. to about 190° C.; and
    maintaining said heating for between about 30 minutes to about 60 minutes while operating said reactor.

15. The method of claim 1 including wherein said extracting step is performed using at least about 3 volumes of ethanol, wherein said ethanol is included in an ethanol/water mixture with a ratio of ethanol to water of between about 70:30 to about 100:0.

16. The method of claim 15 including performing said extracting step at a temperature between about 25 to about 75° C. for between about 2 minutes to about 120 minutes.

17. The method of claim 1 including the step of removing said residual extractant under reduced pressure.

* * * * *